United States Patent
Suzuki et al.

(10) Patent No.: US 6,885,335 B2
(45) Date of Patent: Apr. 26, 2005

(54) VEHICLE-MOUNTED RADIO WAVE RADAR

(75) Inventors: Mitsushige Suzuki, Hitachinaka (JP); Kazuaki Takano, Tokyo (JP); Terumi Nakazawa, Tokyo (JP); Shirou Oouchi, Tokyo (JP); Kazuto Nakamura, Tokyo (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/866,799

(22) Filed: Jun. 15, 2004

(65) Prior Publication Data

US 2004/0222920 A1 Nov. 11, 2004

Related U.S. Application Data

(63) Continuation of application No. 10/645,506, filed on Aug. 22, 2003, now Pat. No. 6,795,013, which is a continuation of application No. 09/789,750, filed on Feb. 22, 2001, now Pat. No. 6,628,226.

(30) Foreign Application Priority Data

May 15, 2000 (JP) ........................................ 2000-141200

(51) Int. Cl.[7] ........................... G01S 13/00; B60T 7/16; B62D 1/24
(52) U.S. Cl. ........................... 342/70; 180/169; 342/175
(58) Field of Search ........................... 342/70, 175, 198; 180/167–169; 701/96, 223, 301; 340/435–436, 992

(56) References Cited

U.S. PATENT DOCUMENTS

| | | | | |
|---|---|---|---|---|
| 5,115,245 A | * | 5/1992 | Wen et al. | 342/175 |
| 5,451,962 A | * | 9/1995 | Steigerwald | 342/175 |
| 5,748,139 A | * | 5/1998 | Kawakami et al. | 342/51 |
| 5,867,120 A | * | 2/1999 | Ishikawa et al. | 342/175 |
| 6,008,750 A | * | 12/1999 | Cottle et al. | 342/42 |
| 6,025,796 A | * | 2/2000 | Crosby, II | 342/70 |
| 6,094,158 A | * | 7/2000 | Williams | 342/70 |
| 6,249,242 B1 | * | 6/2001 | Sekine et al. | 342/70 |
| 6,366,235 B1 | * | 4/2002 | Mayer et al. | 342/70 |
| 6,628,226 B2 | * | 9/2003 | Suzuki et al. | 342/70 |
| 6,795,013 B2 | * | 9/2004 | Suzuki et al. | 342/70 |

FOREIGN PATENT DOCUMENTS

| | | |
|---|---|---|
| DE | 198 20 703 C1 | 8/1999 |
| EP | 0 642 190 A1 | 3/1995 |
| EP | 0 859 425 A1 | 8/1998 |
| JP | 10-261917 | 9/1998 |

* cited by examiner

Primary Examiner—Thomas H. Tarcza
Assistant Examiner—Brian Andrea
(74) Attorney, Agent, or Firm—Crowell & Moring LLP

(57) ABSTRACT

An antenna base, a control circuit section, and a high-frequency circuit section are enclosed in an inner space defined by a housing and a radome. Inside this inner space, the control circuit section and the high-frequency circuit section are surrounded by the antenna base and the housing. A circuit GND common to the control circuit section and the high-frequency circuit section is electrically connected to the antenna base and the housing, and it is connected to a body GND through only capacitive impedance.

1 Claim, 8 Drawing Sheets

$Z2 \neq Z3 \neq 0$ $Z2 \neq Z3 \neq 0$

VEHICLE-MOUNTED RADIO WAVE RADAR

BACKGROUND OF THE INVENTION

1. Field of the Invention

The present invention relates to a vehicle-mounted radio wave radar for detecting a variable such as a distance or relative speed between a host vehicle (radar-loaded vehicle) and a target in front of the host vehicle.

2. Description of the Related Art

There is known a vehicle-mounted radio wave radar for detecting a variable such as a distance or relative speed between a host vehicle and a target, e.g., another vehicle or an obstacle, in front of the host vehicle by using radio waves of the millimeter-wave (EHF) band (60–77 GHz) in which radio wave beams are less attenuated even in foggy or other bad weather and are able to propagate over a long distance.

Examples of such a vehicle-mounted radio wave radar are disclosed in JP, A, 10-79616 and 10-261917.

In the former JP, A, 10-79616, a radome and a housing are employed to provide a structure for enclosing, e.g., an antenna, a high-frequency circuit section for processing a transmitted/received signal in the same high-frequency range as the transmitted/received signal, and a control circuit section for processing the transmitted/received signal in a relatively low-frequency range and performing other required processing. With this structure, the antenna is covered from front by the radome made of a material, such as a resin, which is transparent to electromagnetic waves of the millimeter-wave band with high efficiency, and the remaining part is covered by the housing. The latter JP, A, 10-261917 employs a structure that an antenna, a high-frequency circuit section and a control circuit section are stacked in a housing in this order and fixed to the housing by screws or the likes, and that a ground potential metallic layer is provided between the high-frequency circuit section and the control circuit section.

In the conventional vehicle-mounted radio wave radars described above, ground terminals of the components, i.e., the control circuit section and the high-frequency circuit section, are connected to a ground terminal of a battery remote from the position at which the radar is attached to a vehicle body. The ground terminal of the battery is connected to the vehicle body for grounding. Accordingly, impedance of a certain value depending on wires, body, and other vehicle parts exists between the ground terminals of the control circuit section and the high-frequency circuit section, the ground terminal of the battery, and the vicinity of the position at which the radar is attached to the vehicle body.

The presence of such impedance generates a noise loop through those vehicle parts and may deteriorate the performance of the vehicle-mounted radio wave radar because useless noises and static electricity are applied to the vehicle-mounted radio wave radar.

Further, when the components of the vehicle-mounted radio wave radar are stacked in a housing and fixed to the housing by screws or the likes as disclosed in the latter JP, A, 10-261917, the assembly work is difficult to implement because the housing is usually designed to have the least necessary size just enough to accommodate the components for a size reduction.

SUMMARY OF THE INVENTION

Accordingly, it is an object of the present invention to provide a vehicle-mounted radio wave radar which can restrain a deterioration of the performance caused by adverse effects of useless noises and static electricity. Another object of the present invention is to facilitate assembly work of the vehicle-mounted radio wave radar.

To achieve the above object, according to a first aspect of the present invention, a vehicle-mounted radio wave radar comprises a transmitting/receiving unit for transmitting and receiving a radio signal; a signal processing unit for processing the radio signal transmitted and received by the transmitting/receiving unit; an electrically conductive housing for accomodating the signal processing unit therein; an electrically conductive support plate supporting the transmitting/receiving unit and disposed so as to close an opening of the electrically conductive housing; and an insulating member for electrically isolating the electrically conductive housing and a vehicle body from each other. Ground lines of the transmitting/receiving unit and the signal processing unit are electrically connected to the electrically conductive housing and the electrically conductive support plate.

According to the first aspect, the ground lines of the transmitting/receiving unit and the signal processing unit, which are electronic parts constituting the vehicle-mounted radio wave radar, are electrically connected to the electrically conductive housing and the electrically conductive support plate. Also, the electrically conductive housing is electrically isolated from the vehicle body by the insulating member. Therefore, the transmitting/-receiving unit and the signal processing unit are electrically shielded by the ground potential of themselves, and hence adverse effects of useless noises and static electricity are reduced.

Also, according to a second aspect of the present invention, a vehicle-mounted radio wave radar comprises a transmitting/receiving unit for transmitting and receiving a radio signal; a signal processing unit for processing the radio signal transmitted and received by the transmitting/-receiving unit; an electrically conductive housing for accommodating the signal processing unit therein; an electrically conductive support plate supporting the transmitting/receiving unit and disposed so as to close an opening of the electrically conductive housing; and a capacitive device having one end connected to the electrically conductive housing and the other end connected to the vicinity of a position at which the vehicle-mounted radio wave radar is attached to a vehicle body, the capacitive device electrically connecting the electrically conductive housing and the vehicle body to each other through capacitive impedance. Ground lines of the transmitting/receiving unit and the signal processing unit are electrically connected to the electrically conductive housing and the electrically conductive support plate.

According to the second aspect, the ground lines of the transmitting/receiving unit and the signal processing unit, which are electronic parts constituting the vehicle-mounted radio wave radar, are electrically connected to the electrically conductive housing and the electrically conductive support plate. Also, the electrically conductive housing is electrically connected to the vehicle body through the capacitive device. Therefore, the transmitting/receiving unit and the signal processing unit are electrically shielded by the ground potential of themselves. In addition, a surge, which is produced by the transmitting/receiving unit and the signal processing unit due to a potential difference between the ground potential of themselves and the ground potential in the vicinity of the position at which the radar is attached to a vehicle body, is absorbed by the capacitive impedance of the capacitive device. As a result, adverse effects of useless noises and static electricity are further reduced in comparison with the radar according to the first aspect.

Further, according to a third aspect of the present invention, a vehicle-mounted radio wave radar comprises a transmitting/receiving unit for transmitting and receiving a radio signal; a signal processing unit for processing the radio signal transmitted and received by the transmitting/-receiving unit; an electrically conductive inner housing for accommodating the signal processing unit therein; an electrically conductive support plate supporting the transmitting/receiving unit and disposed so as to close an opening of the electrically conductive housing; an electrically conductive outer casing for accommodating the electrically conductive inner housing therein; and a capacitive device having one end connected to the electrically conductive inner housing and the other end connected to the electrically conductive outer casing, the capacitive impedance device electrically connecting the electrically conductive inner housing and the electrically conductive outer casing to each other through capacitive impedance. Ground lines of the transmitting/receiving unit and the signal processing unit are electrically connected to the electrically conductive inner housing and the electrically conductive support plate, and the electrically conductive outer casing is electrically connected to a vehicle body.

According to the third aspect, the ground lines of the transmitting/receiving unit and the signal processing unit, which are electronic parts constituting the vehicle-mounted radio wave radar, are electrically connected to the electrically conductive inner housing and the electrically conductive support plate. Also, the electrically conductive inner housing is electrically connected to the electrically conductive outer casing that is in turn electrically connected to the vehicle body through the capacitive device. As a result, as with the second aspect, adverse effects of useless noises and static electricity are further reduced in comparison with the radar according to the first aspect.

Moreover, according to a fourth aspect of the present invention, a vehicle-mounted radio wave radar comprises a transmitting/receiving unit for transmitting and receiving a radio signal;

A signal processing unit for processing the radio signal transmitted and received by the transmitting/-receiving unit; an electrically conductive housing for accommodating the signal processing unit therein; and an electrically conductive support plate supporting the transmitting/receiving unit and disposed so as to close an opening of the electrically conductive housing. The electrically conductive housing is electrically connected to a vehicle body, and impedance between a ground terminal of the signal processing unit and the electrically conductive housing is kept small to such an extent that a potential difference produced therebetween is negligible.

According to the fourth aspect, the electrically conductive housing is electrically connected to the vehicle body so as to keep the impedance between the ground terminal of the signal processing unit and the electrically conductive housing small to such an extent that the potential difference produced therebetween is negligible. As a result, the generation of useless noises and static electricity attributable to a noise loop can be restrained.

Additionally, in the vehicle-mounted radio wave radar according to any of the above aspects of the present invention, the radar may be assembled by placing the signal processing unit within the electrically conductive housing while a biasing unit is arranged on the side (same side as the opening of the electrically conductive housing) above the signal processing unit and/or the side (same side as the bottom of the electrically conductive housing) below the signal processing unit; and arranging the electrically conductive support plate supporting the transmitting/-receiving the in the opening of the electrically conductive housing, in which the signal processing unit is placed, in such a manner that the signal processing unit is fixedly positioned within the electrically conductive housing by a biasing force imposed from the biasing unit.

With those features, the signal processing unit can be fixedly positioned within the electrically conductive housing with no need of using screws or the likes, and the assembly work can be facilitated.

DESCRIPTION OF THE PREFERRED EMBODIMENTS

One preferred embodiment of the present invention will be described below.

Figure 1:
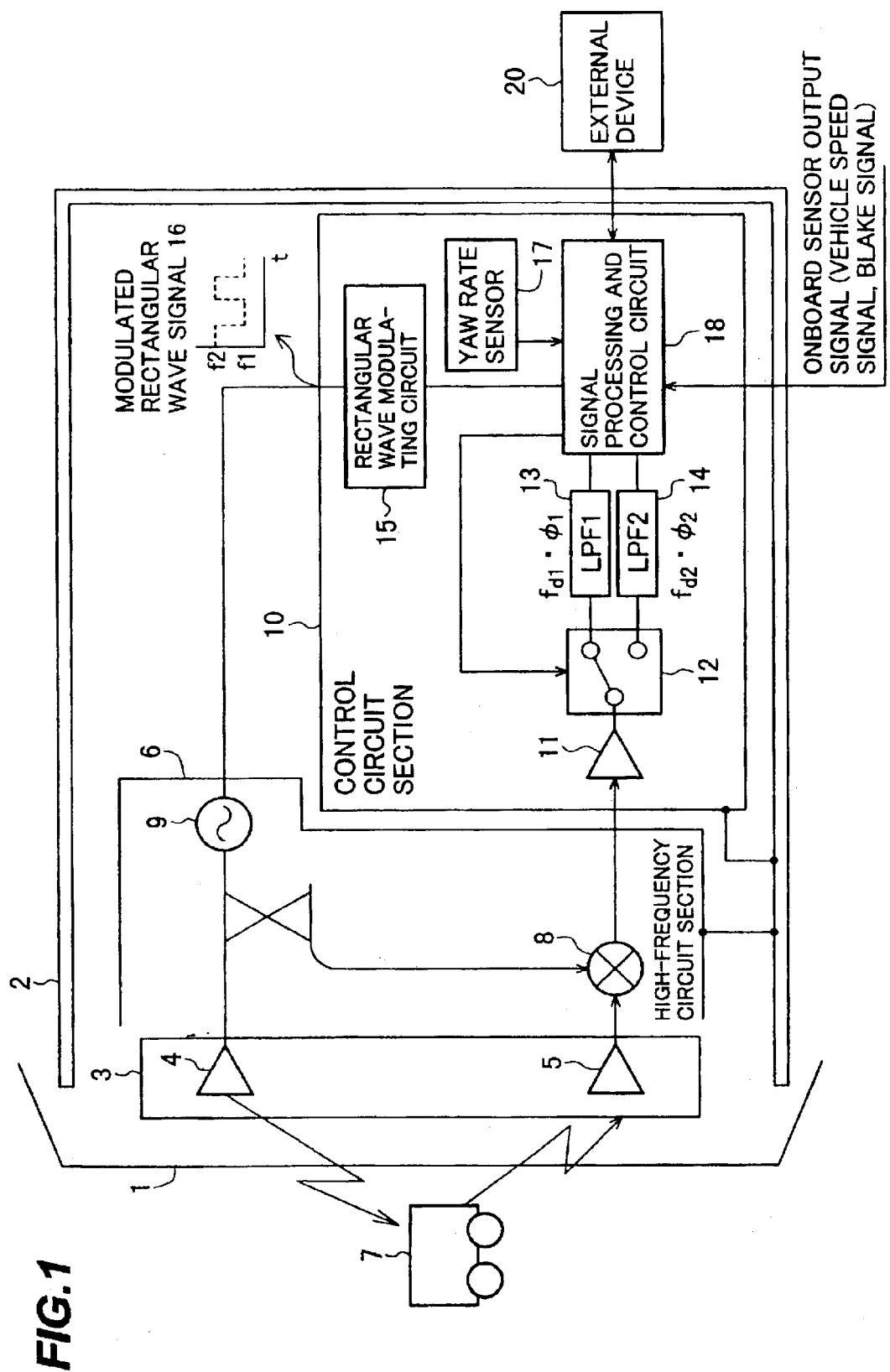
FIG. 1 is a block diagram showing the functional configuration of a vehicle-mounted radio wave radar according to one embodiment of the present invention.

FIG. 1 shows the functional configuration of a vehicle-mounted radio wave radar according to one embodiment of the present invention.

Figure 2:
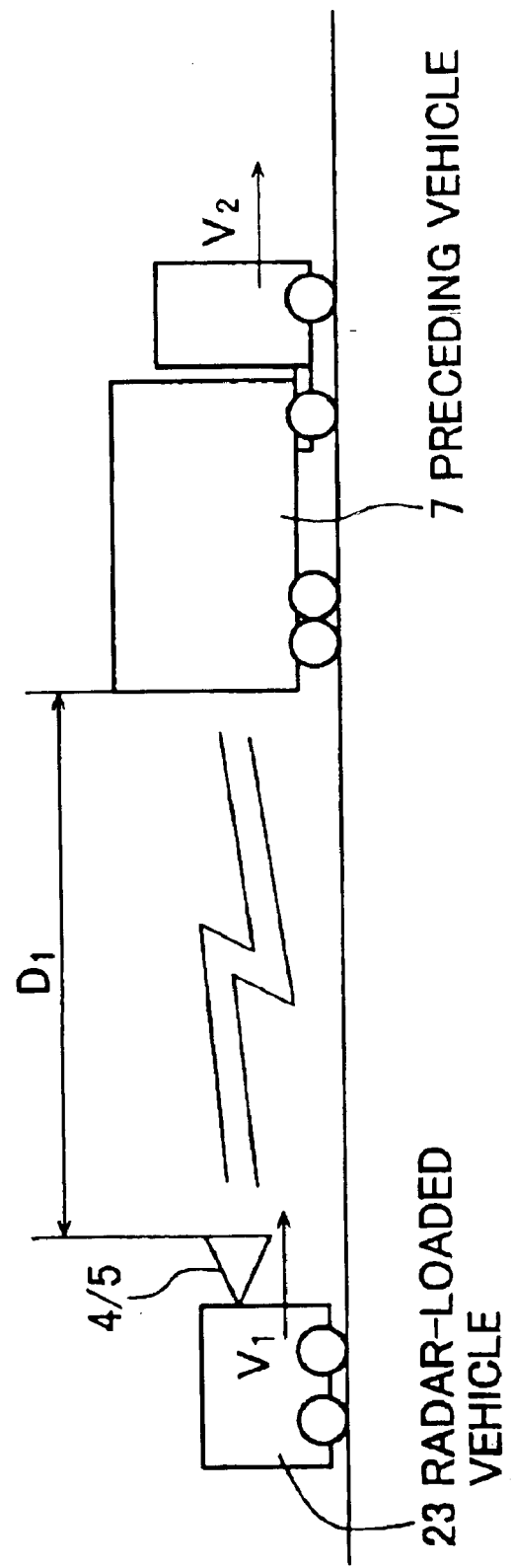
FIG. 2 is a representation for explaining a situation in which the vehicle-mounted radio wave radar shown in FIG. 1 operates.

Referring to FIG. 1, a signal processing and control circuit 18 performs rectangular wave modulation of an oscillation signal, which is supplied from an oscillator 9, through a rectangular wave modulating circuit 15. A transmitting antenna 4 is energized by the modulated oscillation signal to emit electromagnetic waves forward. Also, as shown in FIG. 2, the electromagnetic waves reflected by a preceding vehicle 7 is received by a receiving antenna 5 and supplied to the signal processing and control circuit 18 through a mixer 8, an amplifier 11, a selector switch 12, and low-pass filters 13, 14. The signal processing and control circuit 18 computes a variable such as a relative speed V2–1 or a vehicle-to-vehicle distance D1 between a host (radar-loaded) vehicle 23 and the preceding vehicle 7 going ahead of the host vehicle 23 based on the received signals and output signals from an internal yaw rate sensor 17 and various external sensors. Results of the computation, etc. are informed to an external device 20 as appropriate.

In the above arrangement, the signal processing and control circuit 18, the rectangular wave modulating circuit 15, the amplifier 11, the selector switch 12, the low-pass filters 13, 14, and the yaw rate sensor 17 constitute a control circuit section 10. Also, the oscillator 9 and the mixer 8 constitute a high-frequency circuit section 6. Further, in FIG. 1, numeral 1 denotes a redome made of a resin allowing electromagnetic waves of the millimeter-wave band to pass through it without attenuation. Numeral 2 denotes a housing, and 3 denotes an antenna base for the antennas 4, 5.

A description will be next made of the structure of the vehicle-mounted radio wave radar according to the embodiment while primarily focusing on the relationship between a circuit GND (ground), which is a common GND to both the control circuit section 10 and the high-frequency circuit section 6, and a body GND.

Figure 3A:
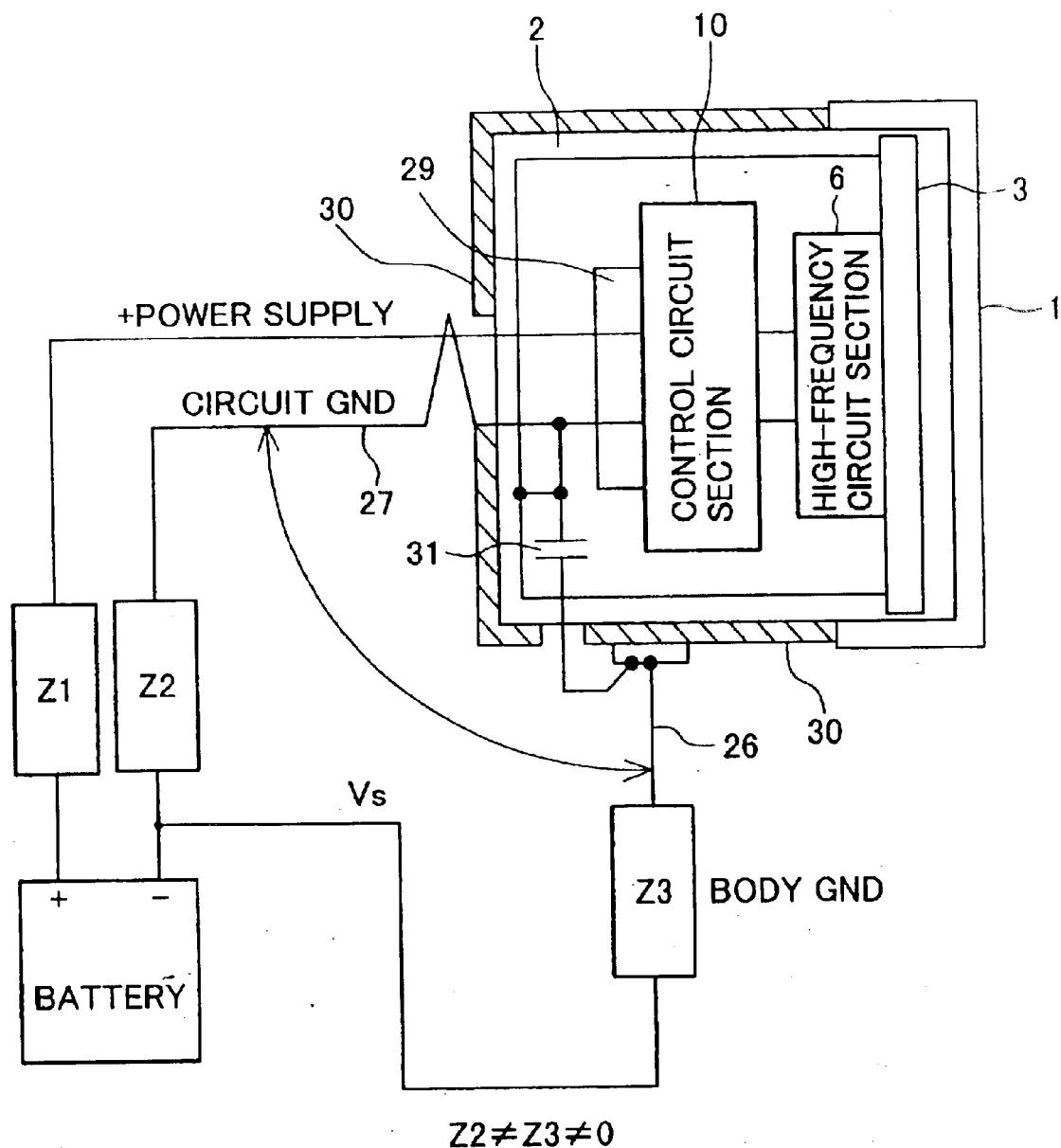
FIGS. 3A, 3B and 3C show examples of the structure of the vehicle-mounted radio wave radar shown in FIG. 1 with attention focused on the relationship between a circuit GND (ground), which is a common GND to a control circuit section and a high-frequency circuit section, and a body GND.
Figure 3B:
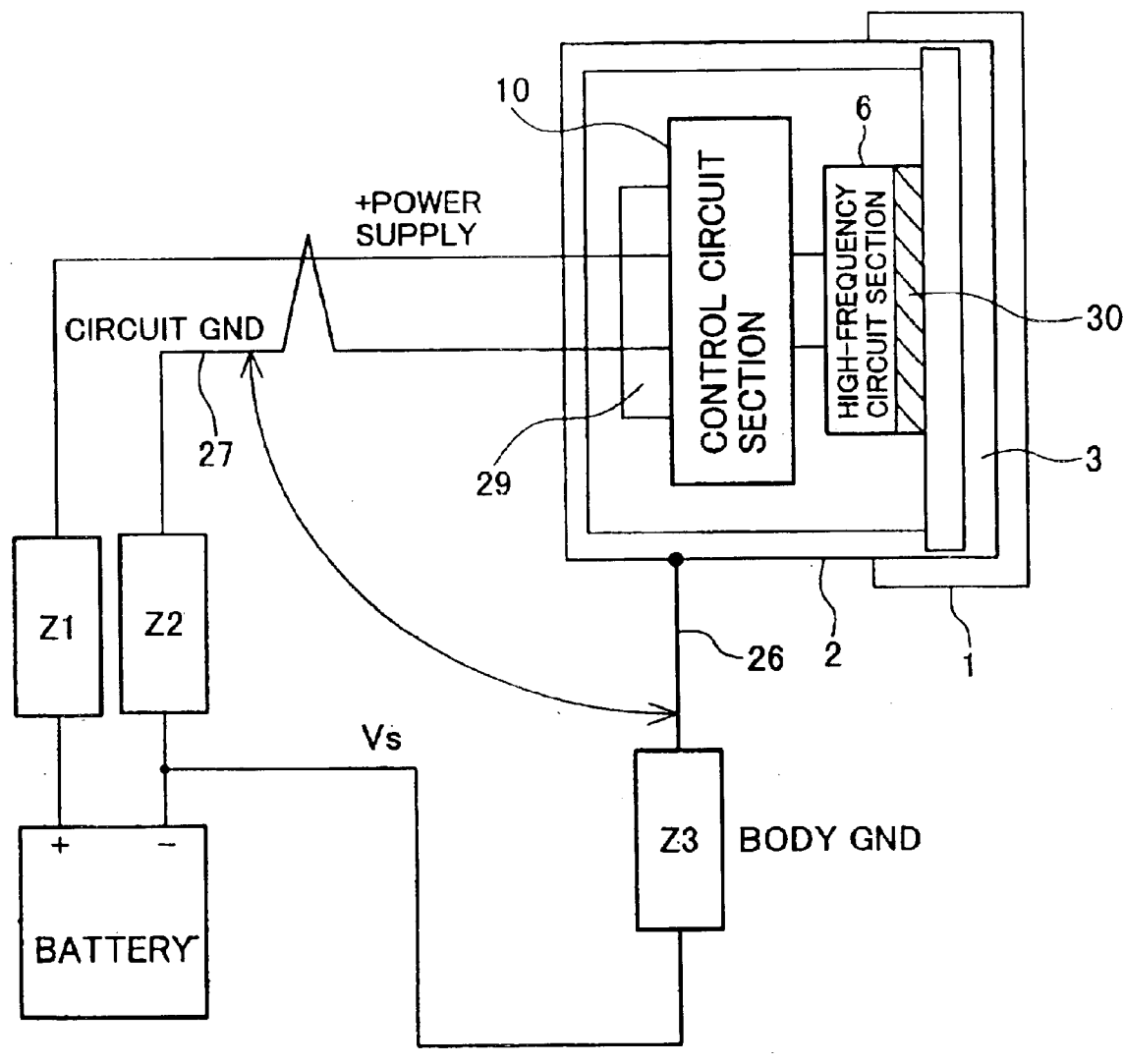
Figure 3C:
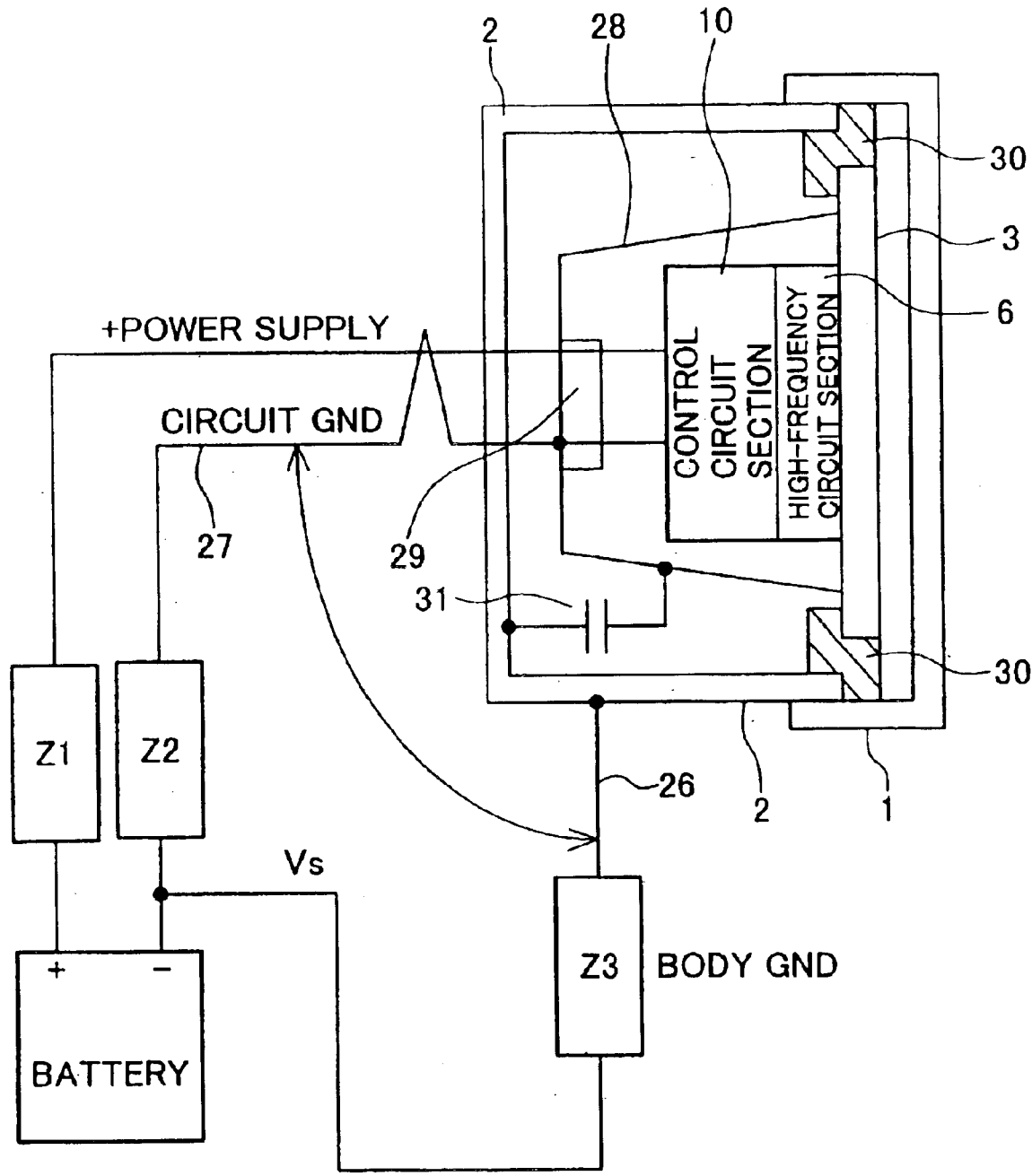

FIGS. 3A, 3B and 3C show examples of the structure of the vehicle-mounted radio wave radar shown in FIG. 1 with attention focused on the relationship between a circuit GND 27, which has a ground potential common to both the control circuit section 10 and the high-frequency circuit section 6, and a body GND 26 which has a ground potential in the vicinity of the position at which the vehicle-mounted radio wave radar is attached to a vehicle body. As shown, a positive power supply terminal of the vehicle-mounted radio wave radar is connected to a positive terminal of a battery, whereas the circuit GND 27 and the body GND 26 are connected to a negative terminal of the battery. Also, in FIG. 3, Z1 represents impedance between the positive power supply terminal of the vehicle-mounted radio wave radar, Z2 represents impedance between the circuit GND 27 and the negative terminal of the battery, and Z3 represents impedance between the body GND 26 and the negative terminal of the battery. Additionally, numeral 29 denotes a filter.

FIG. 3A shows a first example of the structure of the vehicle-mounted radio wave radar.

In the first example of the structure shown in FIG. 3A, the high-frequency circuit section 6 is entirely covered by a metal, and this metal is connected to a ground line of the high-frequency circuit section 6. The transmitting antenna 4 and the receiving antenna 5 are mounted on the metal-made antenna base 3. The housing 2 is an electrically conductive one. An outer wall surface of the housing 2 is however covered by an insulator 30 in its portion attached to the vehicle body. Also, the antenna base 3, the control circuit section 10, and the high-frequency circuit section 6 are arranged in a space defined by the housing 2 and the antenna base 3. Furthermore, the antenna base 3 is covered by a radome 1.

The circuit GND 27 common to both the control circuit section 10 and the high-frequency circuit section 6 is electrically connected to the antenna base 3 and the housing 2. The circuit GND 27 is also connected to the body GND 26 through capacitive impedance 31 in the form of, e.g., a capacitor. A resistance connected to the capacitor in parallel (for protection of the capacitor) can be provided in a sufficient value by the impedance of the capacitor itself.

With the first example of the structure shown in FIG. 3A, the circuit GND 27, which has a ground potential common to both the control circuit section 10 and the high-frequency circuit section 6, is electrically connected to the housing 2 and the antenna base 3. Further, the housing 2 is electrically isolated from the body GND 26 by the insulator 30 except for a portion where the housing 2 is connected the body GND 26 through the capacitive impedance 31. Accordingly, the control circuit section 10 and the high-frequency circuit section 6 are electrically shielded by the ground potential of themselves. Also, since the circuit GND 27 and the body GND 26 are electrically connected to each other through the capacitive impedance 31, a surge generated between the circuit GND 27 and the body GND 26 is absorbed by the capacitive impedance 31. As a result, adverse effects of useless noises and static electricity caused by the presence of the impedances Z1, Z2 can be held down at a low level.

Additionally, in the first example of the structure shown in FIG. 3A, when the position at which the vehicle-mounted radio wave radar is attached to the vehicle body is insulated from the body GND 26 by the use of a resin-made bumper or the like, there is no need of providing the insulator 30.

FIG. 3B shows a second example of the structure of the vehicle-mounted radio wave radar.

In the second example of the structure shown in FIG. 3B, the high-frequency circuit section 6 is entirely covered by a metal, and this metal is connected to a ground line of the high-frequency circuit section 6. The transmitting antenna 4 and the receiving antenna 5 are mounted on the metal-made antenna base 3. The housing 2 is an electrically conductive one. The antenna base 3, the control circuit section 10, and the high-frequency circuit section 6 are arranged in a space defined by the housing 2 and the antenna base 3. Furthermore, the antenna base 3 is covered by a radome 1. Also, the high-frequency circuit section 6 is mechanically attached to the antenna base 3 through an insulator 30.

The antenna base 3 and the housing 2 are electrically connected to the body GND 26.

With the second example of the structure shown in FIG. 3B, the control circuit section 10 and the high-frequency circuit section 6 are electrically shielded by the ground potential at the body GND 26. However, it is also possible in this case to suppress the generation of useless noises and static electricity by determining the position, at which the vehicle-mounted radio wave radar is connected to the vehicle body, so that the impedance (Z1+Z2) between the body GND 26 and the circuit GND 27 becomes small to such an extent that a potential difference Vs produced between the body GND 26 and the circuit GND 27 is negligible. The radar attachment position satisfying the above condition can be determined by measuring an impedance value between the body GND 26 and the circuit GND 27 with a tester or the like.

FIG. 3C shows a third example of the structure of the vehicle-mounted radio wave radar.

In the third example of the structure shown in FIG. 3C, the transmitting antenna 4 and the receiving antenna 5 are mounted on the metal-made antenna base 3. The high-frequency circuit section 6 and the control circuit section 10 are arranged in a space defined by the antenna base 3 and an electrically conductive shield case 28. Further, the antenna base 3 and the electrically conductive shield case 28, which surround the high-frequency circuit section 6 and the control circuit section 10 in the space defined by themselves, are arranged in a space defined by the radome 1 and the electrically conductive housing 2. In addition, the antenna base 3 and the shield case 28 are mechanically fixed in place in such a manner that they are electrically isolated from the housing 2 by an insulator 30 except for a portion connected to the housing 2 through capacitive impedance 31 described below.

The circuit GND 27 common to both the control circuit section 10 and the high-frequency circuit section 6 is electrically connected to the shield case 28, whereas the body GND 26 is electrically connected to the housing 2. Further, the shield case 28 and the housing 2 are electrically connected to each other through the capacitive impedance 31 in the form of, e.g., a capacitor. A resistance connected to the capacitor in parallel (for protection of the capacitor) can be provided in a sufficient value by the impedance of the capacitor itself.

The third example of the structure shown in FIG. 3C is more complicated than the first example of the structure shown in FIG. 3A, but can hold down adverse effects of useless noises and static electricity caused by the presence of the impedances Z1, Z2 at a low level as with the first example of the structure shown in FIG. 3A.

A practical example of the structure of the vehicle-mounted radio wave radar according to the embodiment will be described below.

Figure 4:
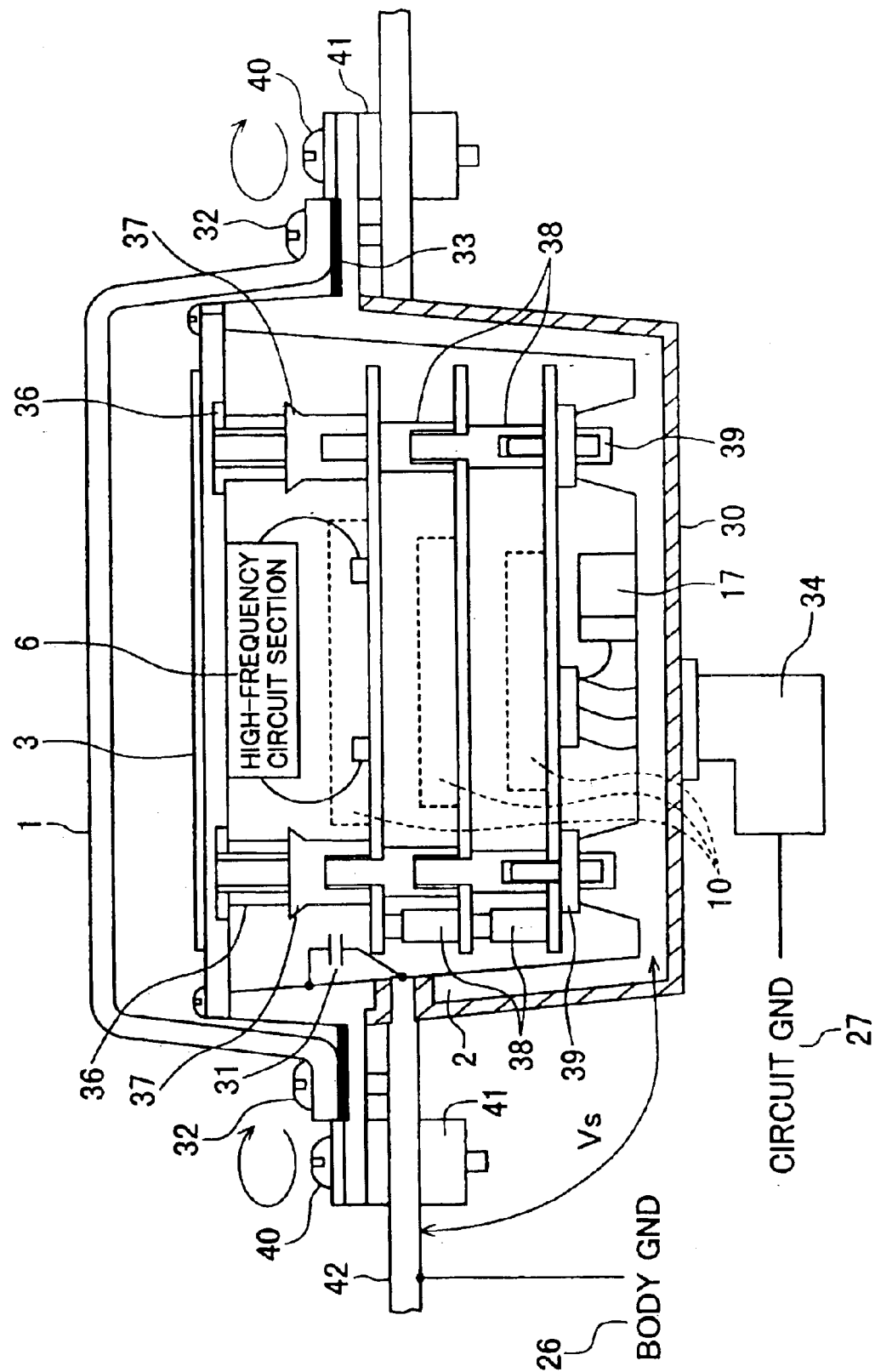
FIG. 4 is a sectional view of the vehicle-mounted radio wave radar shown in FIG. 1 in a state where it is attached to a vehicle body.
Figure 5:
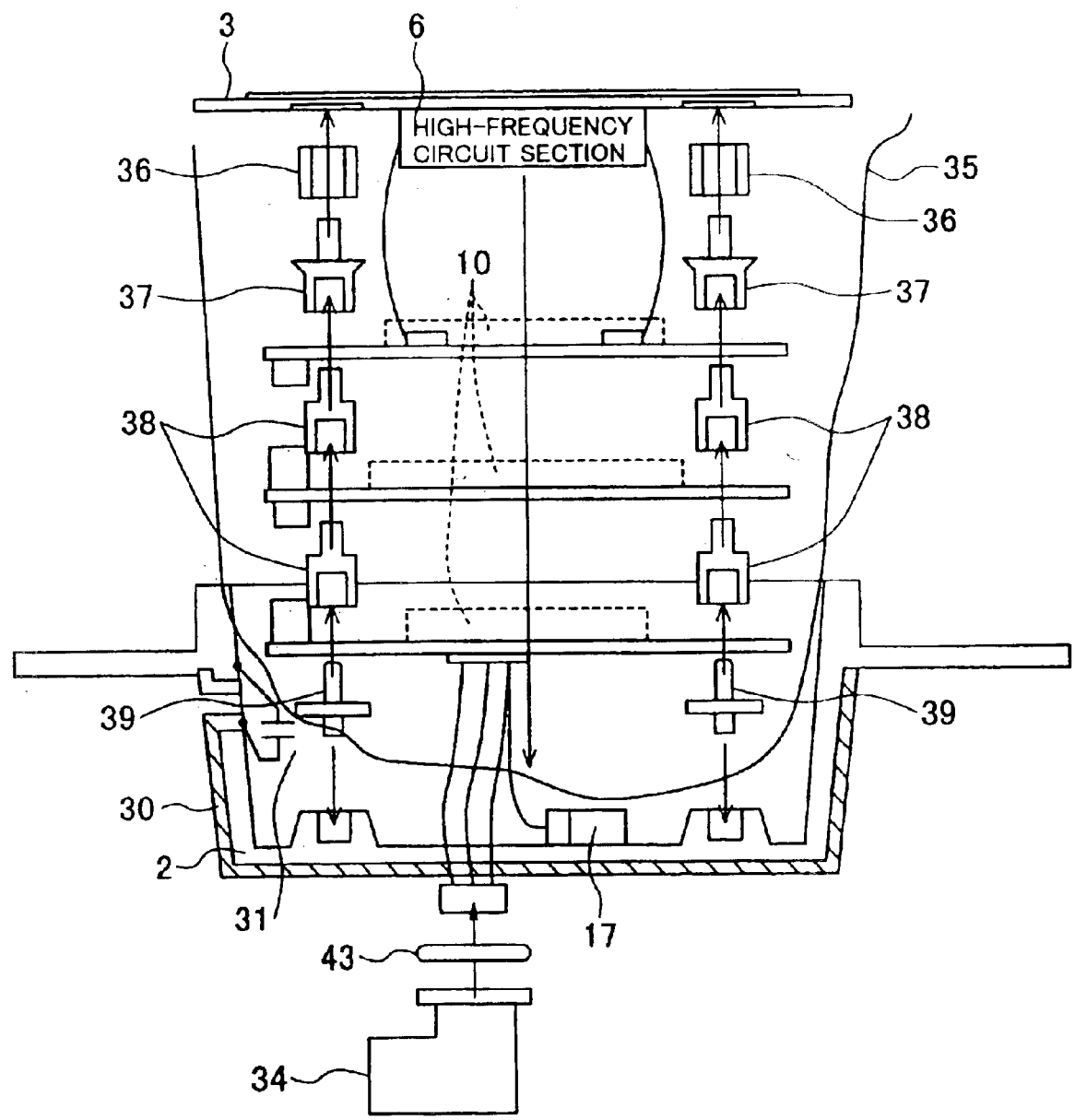
FIG. 5 is a schematic view, showing another assembly method, of the structure of the vehicle-mounted radio wave radar shown in FIG. 1.
Figure 6:
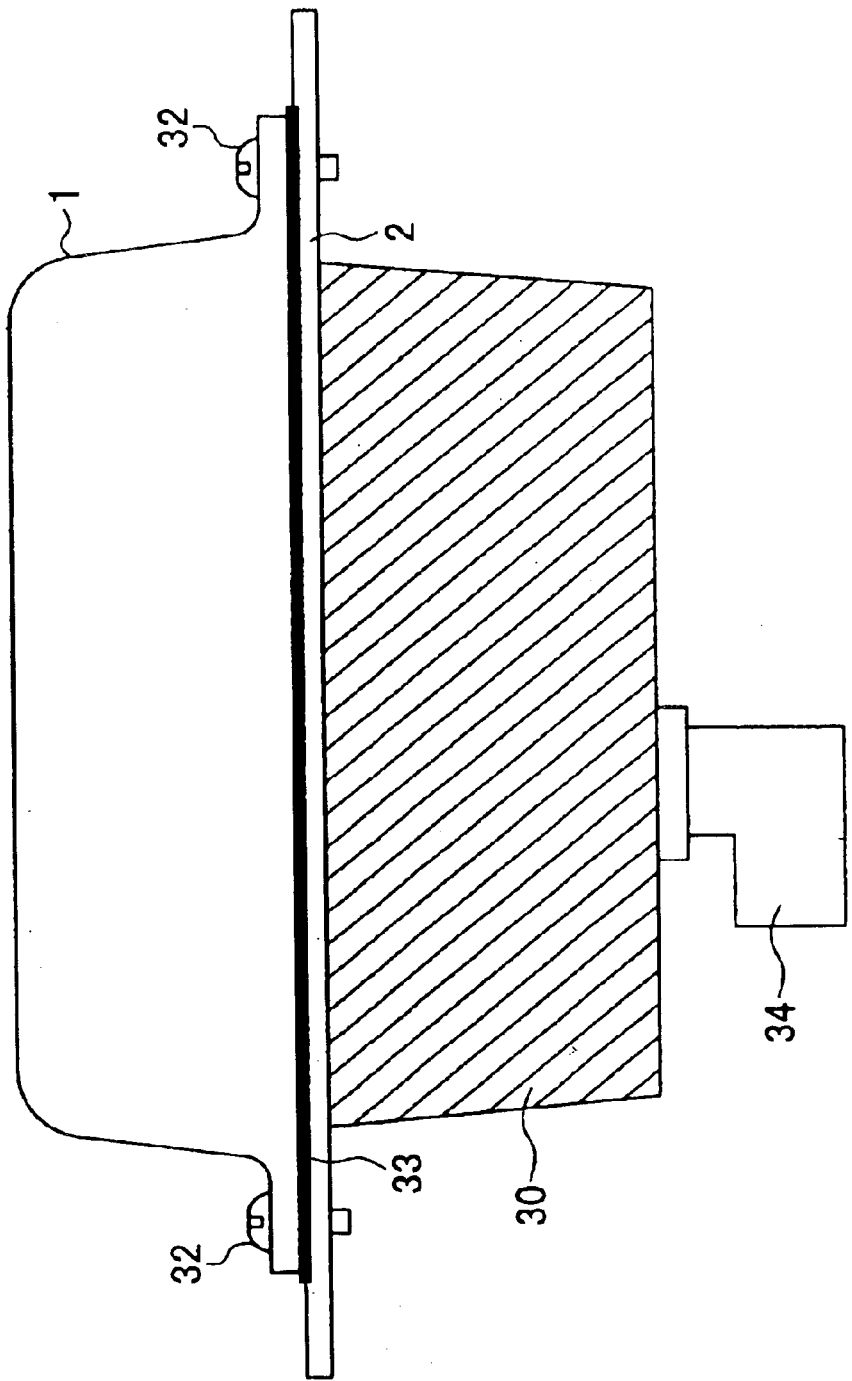
FIG. 6 is an external view showing an appearance of the vehicle-mounted radio wave radar shown in FIG. 1.

FIG. 4 is a sectional view of the vehicle-mounted radio wave radar according to the embodiment in a state where it is attached to the vehicle body; FIG. 5 is a schematic view, showing another assembly method, of the structure of the vehicle-mounted radio wave radar according to the embodiment; and FIG. 6 is an external view showing an appearance of the vehicle-mounted radio wave radar according to the embodiment.

Referring to FIGS. 4 and 5, the high-frequency circuit section 6 is mechanically fixed to the antenna base 3. The antenna base 3 is fixed to the housing 2 by, e.g., screws made of conductors. The control circuit section 10 comprises a plurality of circuit boards. The circuit boards are stacked in the multilayered form at predetermined intervals therebetween through spacers 37 to 39, and are arranged between the antenna base 3 and the housing 2. The spacers 37 to 39 are electrically conductive, and ground lines of the multilayered circuit boards are connected to each other through the spacers 37–39. Further, in FIGS. 4 and 5, a spacer 36 formed of a resilient member, such as rubber or a spring, and having the function of absorbing vibrations is attached to the spacer 37, which is disposed between the uppermost circuit board and the antenna base 3, for the purpose of restraining vibrations and absorbing assembly and dimensional errors. In the assembled state, the antenna base 3 presses the spacer 36 with the function of absorbing vibrations and the spacer 37–39 in a direction in which the circuit boards of the control circuit section 10 are placed in the housing 2. Moreover, the ground lines of the circuit boards of the control circuit section 10 are electrically connected to ground lines of the high-frequency circuit section 6 through the housing 2 and the antenna base 3. The housing 2 is connected to the body GND 26 through capacitive impedance 31 in the form of, e.g., a capacitor.

Additionally, in FIGS. 4 and 5, numeral 43 denotes an O-ring for water tightness, 33 denotes a packing for water tightness, 32 denotes a screw, and 34 denotes a waterproof connector.

Thus, in the vehicle-mounted radio wave radar of this embodiment, the high-frequency circuit section 6, the control circuit section 10, the spacer 36 with the function of absorbing vibrations, and the spacer 37–39 are disposed in the space defined by the antenna base 3 and the housing 2. The control circuit section 10 and the high-frequency circuit section 6 are hence electrically shielded by the ground potential of themselves. Further, in FIGS. 4 and 5, an antenna surface is formed on the upper side of the antenna base 3 on which the transmitting antenna 4 and the receiving antenna 5 are mounted, and the antenna base 3 is covered by the radome 1. This arrangement protects the transmitting antenna 4 and the receiving antenna 5 from the external physical environment (contamination attributable to moisture, dust, etc.).

Also, as shown in FIG. 4, the vehicle-mounted radio wave radar of this embodiment is attached to a vehicle body 42 through screws 40 and insulating bushings 41, each of the bushings 41 having a radar-axis adjusting mechanism in the form of a groove structure similar to a screw. At the same time, the housing 2 and the body GND 26 are electrically isolated by an insulator 30, which is provided on an outer wall surface of the housing, except for a portion where they are connected to each other through the capacitive impedance 31, as shown in FIGS. 4 and 6. In this state, the capacitive impedance 31 is connected in parallel to a certain value of impedance (Z2+Z3) that exists between the housing 2 and the body CND 26. Therefore, noise energy generated by the certain value of impedance is absorbed by the capacitive impedance 31 and reduced. In addition, since the housing 2 and the body CND 26 are short-circuited in AC fashion, it is possible to avoid the generation of a noise loop via the vehicle body and to hold useless noises at a low level, which are attributable to the potential difference between the circuit GND 27 and the body GND 26. As a result, a deterioration of the radar performance caused by adverse effects of useless noises and static electricity can be restrained.

The vehicle-mounted radio wave radar of this embodiment may be assembled as shown in FIG. 5. More specifically, the spacer 36 with the function of absorbing vibrations and the spacers 37–39 are prepared as being of the press-fitting type. After tentatively assembling the circuit boards of the control circuit section 10 using the spacers 36–39, the circuit boards are inserted downward in the housing 2 with the aid of a paper tape 35 or the like. Then, the paper tape 35 or the like is removed and the antenna base 3 is fixed to the housing 2 so as to press the assembled components. By so assembling the radar, the control circuit section 10 can be fixedly disposed within the housing 2 without using screws or other any fixtures. Accordingly, the assembly work is facilitated and the radar size can be easily reduced.

The housing 2 may be formed of a resin having a surface on which a metal is coated or plated, or a resin mixed with metallic powder. In any case, except for the second example of the structure shown in FIG. 3B, a portion of the housing, which contacts the vehicle body, is electrically isolated from the vehicle body. By employing such a resin, the weight of the housing 2 can be reduced while maintaining the electromagnetic shielding function.

Furthermore, in the first example of the structure shown in FIG. 3A, the housing 2 may comprise an outer layer electrically connected to the vehicle body when the vehicle-mounted radio wave radar is attached to the vehicle body, and an inner layer electrically isolated from the outer layer, with the circuit GND 27 connected to only the circuit GND 27. Further, one terminal end of the capacitive impedance 31 is connected to the inner layer of the housing 2, and the other end terminal of the capacitive impedance 31 is connected to the outer layer of the housing 2.

It is to be noted that electrical isolation between the housing 2 and the vehicle body can be realized by any other suitable methods and structures than those described above.

According to the vehicle-mounted radio wave radar of the present invention, as described above, a deterioration of the radar performance caused by adverse effects of useless noises and static electricity can be restrained.

What is claimed is:

1. A vehicle-mounted radio wave radar, comprising:
   transmitting/receiving section for transmitting and receiving a radio signal;

signal processing section for processing the radio signal transmitted and received by said transmitting/receiving section;

an electrically conductive housing for accommodating said signal processing section therein;

an electrically conductive member supporting said transmitting/receiving section and disposed so as to close an opening of said electrically conductive housing, and electrically connected to said electrically conductive housing; and an insulating member for inhibiting direct current from passing through said insulating member, wherein said electrically conductive housing is connected to a vehicle body through at least said insulating member, ground of said transmitting/receiving section and said signal processing section being electrically connected to at least said electrically conductive housing or said electrically conductive member.

* * * * *